(12) United States Patent
Etoh et al.

(10) Patent No.: US 6,546,120 B1
(45) Date of Patent: Apr. 8, 2003

(54) CORRESPONDENCE-BETWEEN-IMAGES DETECTION METHOD AND SYSTEM

(75) Inventors: Minoru Etoh, Kanagawa (JP); Kouichi Hata, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/373,408

(22) Filed: Aug. 12, 1999

(51) Int. Cl.$^7$ ................................................. G06K 9/00
(52) U.S. Cl. ........................ 382/107; 348/154; 348/155
(58) Field of Search ................................. 382/107, 154; 348/154, 155, 461, 463, 42, 140; 340/825

(56) References Cited

U.S. PATENT DOCUMENTS 5,655,028 A * 8/1997 Soll et al. .................... 382/133
5,915,033 A * 6/1999 Tanigawa et al. ........... 382/106
6,353,678 B1 * 3/2002 Guo et al. .................... 382/154

* cited by examiner

*Primary Examiner*—Timothy M. Johnson
*Assistant Examiner*—Abolfazl Tabatabai
(74) *Attorney, Agent, or Firm*—Pearne & Gordon LLP

(57) ABSTRACT

A correspondence-between-images detection method includes the following three basic steps: (1) Error operation step based on block matching: Block matching is executed by making a search for displacement with the difference absolute sum of intensity errors reaching the minimum from within a comparison image with respect to a block of 16×16 pixels in a reference image. (2) Quadratic error function approximation step with differential operator: Assuming that the block matching result forms a curved surface is parabolic, quadratic error function approximation is executed. (3) Nonlinear iterative minimization step with respect to planar perspective mapping parameter: The quadratic error function sum on the whole screen is found by executing a sequential recursive step of a Newton's method improved for planar perspective mapping parameter.

8 Claims, 7 Drawing Sheets

IMAGE PROJECTION FACE 1    IMAGE PROJECTION FACE 2

IMAGE 1    IMAGE 2

CORRESPONDENCE-BETWEEN-IMAGES DETECTION METHOD AND SYSTEM

BACKGROUND OF THE INVENTION

1. Field of the Invention

This invention relates to a correspondence-between-images detection method and system belonging to, for example, the following technical fields:

1. Image coder-decoder for knowing the correspondence between images consecutive in time sequence and transmitting and storing the images in a small coding amount.
2. Measuring device for finding the correspondence holding between stereoscopic images and measuring a distance.
3. Image processor for compensating motion of an image caused by unintended motion of a camera, such as camera shake.
4. Image processor for integrating a plurality of images into a wide-view image such as a panoramic image.

2. Description of the Related Art

As the viewpoint of a camera or an object moves, the object is projected at a different position in an image. The correspondence between the two projection images can be represented as mapping of a position set on one image to a position set on the other.

There are various models of mappings and the following are known as mappings from point to point: Two-dimensional affine mapping represented in expressions 1 to 3; two-dimensional quadratic form mapping represented in expressions 4 to 6; and planar perspective mapping represented in expressions 7 and 8.

They represent the correspondence between projection images produced by relative motion between an object and a camera sufficiently distant from each other, an instantaneous move of a plane, and an arbitrary move of a plane.

Here, (x, y) and (x', y') denote the corresponding image positions between different projection images, superscript letter t denotes transpose of a vector, a matrix, and solid letter x represents coordinates (x, y).

Two-dimensional affine mapping:

$$x' = P_a(x)a \quad (1)$$

$$P_a(x) = \begin{pmatrix} x & y & 1 & 0 & 0 & 0 \\ 0 & 0 & 0 & x & y & 1 \end{pmatrix} \quad (2)$$

Parameters of two-dimensional affine mapping:

$$a = (a_0, a_1, a_2, a_3, a_4, a_5)^t \quad (3)$$

Two-dimensional quadratic form mapping:

$$x' = P_q(x)q \quad (4)$$

$$P_q(x) = \begin{pmatrix} x & y & x^2 & xy & 1 & 0 & 0 & 0 \\ 0 & 0 & xy & y^2 & 0 & x & y & 1 \end{pmatrix} \quad (5)$$

Parameters of two-dimensional quadratic form mapping:

$$q = (q_0, q_1, q_2, q_3, q_4, q_5, q_6, q_7)^t \quad (6)$$

Plane perspective mapping:

$$x' = f(x; p) = \begin{pmatrix} \dfrac{p_0 x + p_1 y + p_2}{p_6 x + p_7 y + 1} \\ \dfrac{p_3 x + p_4 y + p_5}{p_6 x + p_7 y + 1} \end{pmatrix} \quad (7)$$

Parameters of plane perspective mapping:

$$p = (p_0, p_1, p_2, p_3, p_4, p_5, p_6, p_7)^t \quad (8)$$

If the parameters of each mapping are defined, a function of determining the positional correspondence between different images is defined. If the six parameters shown in expression 3 are found in the two-dimensional affine mapping, the correspondence between the images is described; if the eight parameters shown in expression 6 are found in the two-dimensional quadratic form mapping, the correspondence between the images is described; and if the eight parameters shown in expression 8 are found in the planar perspective mapping, the correspondence between the images is described.

The mapping representing the correspondence between the images is not limited to the point-to-point correspondence; a more general mapping from a position set on one image to a position set on the other is also possible. In the above-described point-to-point correspondence, there is a restriction (plane) on the projection condition and the structure of an object, but mapping generally holding between the different projection images of a rigid body is known as epipolar geometry. It is a mapping from a line to a line, called epipolar mapping in the specification. A mapping from a point to a line exists as generalization of the epipolar mapping. It is represented in expressions 9 and 10 and will be referred to as generalized epipolar mapping. Generalized epipolar mapping:

$$\text{Line, } l: \left\{ x' \,\middle|\, x'^t F \tilde{x} = 0 \right\} \quad (9)$$

F in expression 9 denotes a 3×3 matrix called a fundamental matrix and symbol ~ denotes homogeneous coordinate representation shown in expression 10 (two-dimensional position coordinates are represented as a three-dimensional vector as (x, y, 1) rather than (x, y)). For the generalized epipolar mapping, x' mapped from x satisfies an equation of a line represented by the matrix F. That is, a point is mapped to a line. The mapping parameter is the matrix F itself (a detailed description of the epipolar mapping will be again given in Embodiment).

To find the mapping parameters, hitherto, a method based on feature point correspondence or a method using direct minimization of an intensity error has been used. The planar perspective mapping is taken as an example.

Since the number of parameters to be found is eight in the planar perspective mapping, if four-point correspondence is obtained between different projection images, a function can be defined.

Eight simultaneous equations are obtained from expression 7 with respect to the four-point correspondence, whereby the mapping parameters can be calculated easily. The parameters of the two-dimensional affine mapping can be found from six simultaneous equations in the three-point correspondence and those of the two-dimensional quadratic form mapping can be found from eight simultaneous equations in the four-point correspondence.

$$\tilde{x} = (x, y, 1)^t, \quad \tilde{x}' = (x', y', 1)^t, \quad (10)$$

For the generalized epipolar mapping, a method based on eight-point correspondence by Longuet-Higgins is disclosed in document "H. C. Longuet-Higgins, "A computer algorithm for reconstructing a scene from two projections," Nature vol. 293, pp. 133–135, 1981." In the specification, such a method based on the feature point correspondence of projection images will be referred to as a parameter estimation method based on feature point correspondence.

The method of direct minimization of an intensity error is disclosed in, for example, "R. Szeliski, "Video Mosaics for Virtual Environment," IEEE Computer Graphics and Applications, pp.22–30, March 1996."

$$E = \sum_i [I'(x_i', y_i') - I(x_i, y_i)]^2 = \sum_i e_i^2 \quad (11)$$

This method is to minimize a intensity error defined in expression 11 with respect to the whole screen.

In expression 11, I (xi, yi) represents the intensity of the ith pixel and I' (xi', yi') denotes the intensity at the corresponding point of a different projection image.

Here, the planar perspective mapping defined in expression 7 is used as the mapping and the parameters of the planar perspective mapping are found. In the example in the related art, the intensity error is defined as a square error in expression 11, thus minimization of expression 11 is executed according to Levenberg-Marquart method. The details of the Levenberg-Marquart method are disclosed in "W. H Press et al. "Numerical Receipes in C: The art of Scientific Computing," Cambridge Univ. Press 1992."

In the example in the related art, the following steps are repeated for finding mapping parameter p:

Step 1: First, ei shown in expression 11 is calculated from an image.

Step 2: First-order partial differential of expression 11 is found according to expression 12.

$$\frac{\partial e_i}{\partial p_0} = \frac{x_i}{D_i} \frac{\partial I'}{\partial x'}, \cdots, \frac{\partial e_i}{\partial p_7} = -\frac{y_i}{D_i}\left[x_i'\frac{\partial I'}{\partial x'} + y_i'\frac{\partial I'}{\partial y'}\right] \quad (12)$$

In expression 12, Di is a denominator of expression 11, namely, expression 13.

$$D_i = p_6 x_i + p_7 y_i + 1 \quad (13)$$

Step 3: Using expression 12, 8×8 matrix A having element akl and column vector b having element bk are found as shown in expression 14.

$$a_{kl} = \sum_i \frac{\partial e_i \partial e_i}{\partial p_k \partial p_l}, b_k = \sum_i \frac{\partial e_i}{\partial p_k} \quad (14)$$

Step 4: Change of the mapping parameter, δp, is calculated according to expression 15 and a new candidate of the mapping parameter, p', is calculated according to expression 16. λ is a non-negative control variable and the initial value of λ is defined experimentally. I is a identity matrix.

$$\delta p = (A + \lambda I)^{-1} b \quad (15)$$

$$p' = p - \delta p \quad (16)$$

Step 5: The value of expression 11 is calculated from p' and if it is decreased as compared with the value calculated at step 1, p is replaced with p' to update the mapping parameter. Further, in this case, the value of λ is lessened. In contrast, if the value of expression 11 is decreased, the mapping parameter is not updated and the value of λ is increased.

The Levenberg-Marquart method is known as a nonlinear iterative minimization technique effective for parameter estimation for minimizing a square error. If expression 11 can be approximated as a quadratic function with respect to the mapping parameter, a Newton's method can be used and the square error can be minimized based on the change of the mapping parameter, δp, calculated in expression 17 as approximation of the Newton's method (if the original Newton's method is used, the matrix A is found as a second-order partial differential matrix).

$$\delta p = A^{-1} b \quad (17)$$

However, in the nonlinear minimization, generally expression 11 often cannot be approximated as a quadratic function with respect to the mapping parameter. Then, as in expression 15, a identity matrix multiplied by λ is added for executing stable convergence.

If the minimization step achieves success, the adjustment is made with λ set to a small value so that the mapping parameter can be obtained in a small number of repetitions; if the minimization step ends in failure, the adjustment is made with λ set to a large value so that more reliable convergence can be executed.

SUMMARY OF THE INVENTION

In view of the above, an object of the present invention is to eliminate the following problems.

Problem of the method based on feature point correspondence: If the feature points can be found accurately, the parameter estimation method based on feature point correspondence is straightforward and accurate. However, the correspondence between the positions where intensity patterns (features) resemble each other generally produces erroneous correspondence. It is difficult to determine whether or not the correspondence is erroneous correspondence. If the precision of the feature point correspondence is coarse, the precision of the obtained parameter also becomes coarse.

Problem of the method using direct minimization of an intensity error: In the method using direct minimization of an intensity error, if the coordinates of the correspondence positions on a screen differ largely, namely, if motion on the screen is large, parameter estimation is difficult to make.

To solve the above-described problems, according to a first aspect of the invention, there is provided a method of representing correspondence between two images as a function of mapping a position set on one image to a position set to the other and finding a mapping parameter for defining the function, thereby obtaining motion between the images, the method comprising (1a) error operation step of, for a plurality of local areas into which an image is divided, calculating the local area correspondence between two different images as an error and finding a displacement between the local areas reaching the minimum error and an error value in the proximity of the displacement, (1b) error function operation step of finding for each local area a quadratic error function with displacement as a variable from the displacement reaching the minimum error and the error value in the proximity of the displacement, and (1c) nonlinear iterative minimization step of again representing the sum total or partial sum of the quadratic error functions in a parameter representing a function and executing nonlinear iterative minimization for the parameter for finding a parameter, the nonlinear iteractive minimization step comprising (1c-1) partial differential operation step of finding a first-order partial differential vector and a second-order partial differential matrix concerning the parameter of the sum total or partial sum of the quadratic error functions, (1c-2) second-order partial differential matrix change step of increasing diagonal elements of the second-order partial differential matrix in response to the degree to which the minimization in each repetition falls below a predetermined expected value, and (1c-3) parameter change step of multiplying the first-order partial differential vector by an inverse matrix of the modified second-order partial differential matrix for providing a parameter increment or decrement, wherein each parameter increment or decrement provided by iterating the partial differential operation step, the second-order partial differential matrix change step, and the parameter change step is added sequentially for changing the parameter for executing the minimization.

In the specification, the first-order differential vector means a vector that consists of first order partial derivatives, and the second-order differential matrix means a matrix that consists of second order partial derivatives, e.g., Hessian matrix.

According to a second aspect of the invention, there is provided a system of representing correspondence between two images as a function of mapping a position set on one image to a position set to the other and finding a mapping parameter for defining the function, thereby obtaining motion between the images, the system comprising (2a) error operation means for, for a plurality of local areas into which an image is divided, calculating the local area correspondence between two different images as an error and finding a displacement between the local areas reaching the minimum error and an error value in the proximity of the displacement, (2b) error function operation means for finding for each local area a quadratic error function with displacement as a variable from the displacement reaching the minimum error and the error value in the proximity of the displacement, and (2c) nonlinear iteractive minimization means for again representing the sum total or partial sum of the quadratic error functions in a parameter representing a function and executing nonlinear iteractive minimization for the parameter for finding a parameter, the nonlinear iteractive minimization means comprising (2c-1) partial differential operation means for finding a first-order partial differential vector and a second-order partial differential matrix concerning the parameter of the sum total or partial sum of the quadratic error functions, (2c-2) second-order partial differential matrix change means for increasing diagonal elements of the second-order partial differential matrix in response to the degree to which the minimization in each repetition falls below a predetermined expected value, and (2c-3) parameter change means for multiplying the first-order partial differential vector by an inverse matrix of the modified second-order partial differential matrix for providing a parameter increment or decrement, wherein each parameter increment or decrement provided by iterating the partial differential operation means, the second-order partial differential matrix change means, and the parameter change means is added sequentially for changing the parameter for executing the minimization.

According to a third aspect of the invention, there is provided a method of representing correspondence between two images as a function of mapping a position set on one image to a position set to the other and finding a mapping parameter for defining the function, thereby obtaining motion between the images, the method comprising (3a) error operation step of, for a plurality of local areas into which an image is divided, calculating the local area correspondence between two different images as an error and finding a displacement between the local areas reaching the minimum error and an error value in the proximity of the displacement, (3b) error function operation step of finding for each local area a quadratic error function with displacement as a variable from the displacement reaching the minimum error and the error value in the proximity of the displacement, (3c) linear parameter operation step of again representing the sum total or partial sum of the quadratic error functions in a parameter representing a function, classifying into a linear-minimization-possible parameter with a partial derivative for parameter becoming a linear function and a nonlinear minimization parameter with a partial derivative for parameter not becoming a linear function, and finding only the former by executing linear minimization, and (3d) all parameter operation step of finding all parameters by executing nonlinear iteractive minimization of the sum total or partial sum of the quadratic error functions with the parameter found by executing the linear parameter operation step as an initial value for the linear-minimization-possible parameter.

According to a fourth aspect of the invention, there is provided a system of representing correspondence between two images as a function of mapping a position set on one image to a position set to the other and finding a mapping parameter for defining the function, thereby obtaining motion between the images, the system comprising (4a) error operation means for, for a plurality of local areas into which an image is divided, calculating the local area correspondence between two different images as an error and finding a displacement between the local areas reaching the minimum error and an error value in the proximity of the displacement, (4b) error function operation means for finding for each local area a quadratic error function with displacement as a variable from the displacement reaching the minimum error and the error value in the proximity of the displacement, (4c) linear parameter operation means for again representing the sum total or partial sum of the quadratic error functions in a parameter representing a function, classifying into a linear-minimization-possible parameter with a partial derivative for parameter becoming a linear function and a nonlinear minimization parameter with a partial derivative for parameter not becoming a linear function, and finding only the former by executing linear minimization, and (4d) all parameter operation means for finding all parameters by executing nonlinear iteractive minimization of the sum total or partial sum of the quadratic error functions with the parameter found by the linear parameter operation means as an initial value for the linear-minimization-possible parameter.

According to a fifth aspect of the invention, there is provided a method of representing correspondence between two images as a function of mapping a position set on one image to a position set to the other and finding a mapping parameter for defining the function, thereby obtaining motion between the images, the method comprising (5a) error operation step of, for a plurality of local areas into which an image is divided, calculating the local area correspondence between two different images as an error and finding a displacement between the local areas reaching the minimum error and an error value in the proximity of the displacement, (5b) error function operation step of finding for each local area a quadratic error function having a minimum value of zero with displacement as a variable from the displacement reaching the minimum error and the error value in the proximity of the displacement, (5c) recursive minimization step of again representing the weighted sum total of the quadratic error functions in a parameter representing a function and executing recursive minimization for the parameter for finding a parameter, and (5d) weighting resetting step of setting a weight indirectly proportional to the value of the quadratic error function in the iteration process of the recursive minimization.

According to a sixth aspect of the invention, there is provided a system of representing correspondence between two images as a function of mapping a position set on one image to a position set to the other and finding a mapping parameter for defining the function, thereby obtaining motion between the images, the system comprising (6a) error operation means for, for a plurality of local areas into which an image is divided, calculating the local area correspondence between two different images as an error and finding a displacement between the local areas reaching the minimum error and an error value in the proximity of the displacement, (6b) error function operation means for finding for each local area a quadratic error function having a minimum value of zero with displacement as a variable from the displacement reaching the minimum error and the error value in the proximity of the displacement, (6c) recursive minimization means for again representing the weighted sum total of the quadratic error functions in a parameter representing a function and executing recursive minimization for the parameter for finding a parameter, and (6d) weighting resetting means for setting a weight indirectly proportional to the value of the quadratic error function in the iteration process of the recursive minimization.

According to a seventh aspect of the invention, there is provided a method of representing correspondence between two images as a function of mapping a position set on one image to a position set to the other and finding a mapping parameter for defining the function, thereby obtaining motion between the images, the method comprising (7a) error operation step of, for a plurality of local areas into which an image is divided, calculating the local area correspondence between two different images as an error and finding a displacement between the local areas reaching the minimum error and an error value in the proximity of the displacement, (7b) error function operation step of finding for each local area a quadratic error function with displacement as a variable from the displacement reaching the minimum error and the error value in the proximity of the displacement, (7c) error parameter conversion step of again defining the sum total or partial sum of the quadratic error functions in a parameter for defining a function from the relationship between a line mapped and a displacement for determining the value of the quadratic error function, and (7d) minimization step of minimizing the sum total or partial sum of the quadratic error functions again converted into the parameter for parameter and outputting the minimization parameter as motion between the images.

According to an eighth aspect of the invention, there is provided a system of representing correspondence between two images as a function of mapping a position set on one image to a position set to the other and finding a mapping parameter for defining the function, thereby obtaining motion between the images, the system comprising (8a) error operation means for, for a plurality of local areas into which an image is divided, calculating the local area correspondence between two different images as an error and finding a displacement between the local areas reaching the minimum error and an error value in the proximity of the displacement, (8b) error function operation means for finding for each local area a quadratic error function with displacement as a variable from the displacement reaching the minimum error and the error value in the proximity of the displacement, (8c) error parameter conversion means for again defining the sum total or partial sum of the quadratic error functions in a parameter for defining a function from the relationship between a line mapped and a displacement for determining the value of the quadratic error function, and (8d) minimization means for minimizing the sum total or partial sum of the quadratic error functions again converted into the parameter for parameter and outputting the minimization parameter as motion between the images.

DETAILED DESCRIPTION OF THE PREFERRED EMBODIMENTS

Figure 1:
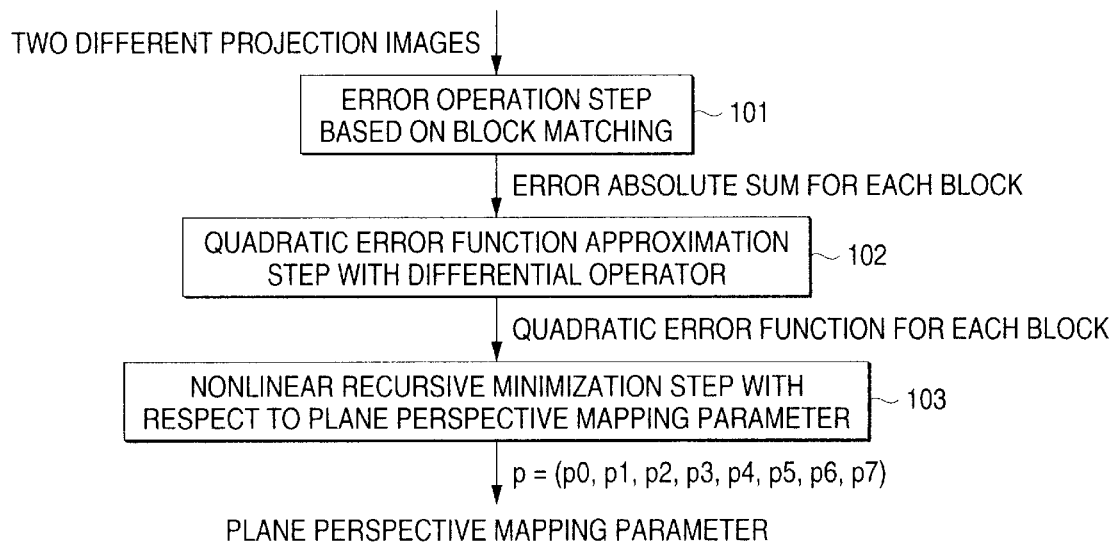
FIG. 1 is a step block diagram of a correspondence-between-images detection method in a first embodiment of the invention.

In the correspondence-between-images detection method of the first aspect of the invention, 1. the error operation step calculates for a plurality of local areas into which an image is divided, the local area correspondence between two different images as an error and finds a displacement between the local areas reaching the minimum error and an error value in the proximity of the displacement.
2. Receiving the result, the error function operation step finds for each local area a quadratic error function with displacement as a variable from the displacement reaching the minimum error and the error value in the proximity of the displacement. Using the quadratic error function found for each local area, the sum total or partial sum of the quadratic error functions is again represented in a mapping parameter.

3. The nonlinear iteractive minimization step minimizes the sum total or partial sum of the quadratic error functions again represented for the mapping parameter. The minimization is made up of the following partial differential operation step, second-order partial differential matrix change step, and parameter change step:

3-1. The partial differential operation step finds a first-order partial differential vector and a second-order partial differential matrix of the sum total or partial sum of the quadratic error functions again represented in the mapping parameter.

3-2. The second-order partial differential matrix change step increases the diagonal elements of the second-order partial differential matrix found at the above-described step in response to the degree to which the minimization in each repetition falls below a predetermined expected value 3-3. The parameter change step multiplies the first-order partial differential vector by an inverse matrix of the modified second-order partial differential matrix for providing a parameter increment or decrement.

Each parameter increment or decrement provided by iterating the partial differential operation step, the second-order partial differential matrix change step, and the parameter change step is added sequentially for changing the parameter for executing the minimization.

Resultantly, the correspondence between the two images is represented as the function for mapping the position set on one image to the position set on the other and the mapping parameter for defining the function can be found.

In the correspondence-between-images detection system of the second aspect of the invention, 1. the error operation means calculates for a plurality of local areas into which an image is divided, the local area correspondence between two different images as an error and finds a displacement between the local areas reaching the minimum error and an error value in the proximity of the displacement.

2. Receiving the result, the error function operation means finds for each local area a quadratic error function with displacement as a variable from the displacement reaching the minimum error and the error value in the proximity of the displacement. Using the quadratic error function found for each local area, the sum total or partial sum of the quadratic error functions is again represented in a mapping parameter.

3. The nonlinear iteractive minimization means minimizes the sum total or partial sum of the quadratic error functions again represented for the mapping parameter.

The minimization is made up of the following partial differential operation means, second-order partial differential matrix change means, and parameter change means:

3-1. The partial differential operation means finds a first-order partial differential vector and a second-order partial differential matrix of the sum total or partial sum of the quadratic error functions again represented in the mapping parameter.

3-2. The second-order partial differential matrix change means increases the diagonal elements of the second-order partial differential matrix found in the above-described means in response to the degree to which the minimization in each repetition falls below a predetermined expected value 3-3. The parameter change means multiplies the first-order partial differential vector by an inverse matrix of the modified second-order partial differential matrix for providing a parameter increment or decrement.

Each parameter increment or decrement provided by iterating the partial differential operation means, the second-order partial differential matrix change means, and the parameter change means is added sequentially for changing the parameter for executing the minimization.

Resultantly, the correspondence between the two images is represented as the function for mapping the position set on one image to the position set on the other and the mapping parameter for defining the function can be found.

In the correspondence-between-images detection method of the third aspect of the invention, 1. the error operation step calculates for a plurality of local areas into which an image is divided, the local area correspondence between two different images as an error and finds a displacement between the local areas reaching the minimum error and an error value in the proximity of the displacement.

2. Receiving the result, the error function operation step finds for each local area a quadratic error function with displacement as a variable from the displacement reaching the minimum error and the error value in the proximity of the displacement. The sum total or partial sum of the quadratic error functions is again represented in a parameter representing a function. Here, each parameter can be classified into a linear-minimization-possible parameter with a partial derivative for the parameter becoming a linear function and a nonlinear minimization parameter with a partial derivative for the parameter not becoming a linear function.

3. The linear parameter operation step finds only the linear-minimization-possible parameter by executing linear minimization.

4. The all parameter operation step finds all parameters by executing nonlinear iteractive minimization with the parameter found by executing the linear parameter operation step as an initial value.

Thus, the correspondence between the two images is represented as the function for mapping the position set on one image to the position set on the other and the mapping parameter for defining the function can be found.

In the correspondence-between-images detection system of the fourth aspect of the invention, 1. the error operation means calculates for a plurality of local areas into which an image is divided, the local area correspondence between two different images as an error and finds a displacement between the local areas reaching the minimum error and an error value in the proximity of the displacement.

2. Receiving the result, the error function operation means finds for each local area a quadratic error function with displacement as a variable from the displacement reaching the minimum error and the error value in the proximity of the displacement. The sum total or partial sum of the quadratic error functions is again represented in a parameter representing a function. Here, each parameter can be classified into a linear-minimization-possible parameter with a partial derivative for the parameter becoming a linear function and a nonlinear minimization parameter with a partial derivative for the parameter not becoming a linear function.

3. The linear parameter operation means finds only the linear-minimization-possible parameter by executing linear minimization.

4. The all parameter operation means finds all parameters by executing nonlinear iteractive minimization with the parameter found by the linear parameter operation means as an initial value.

Thus, the correspondence between the two images is represented as the function for mapping the position set on one image to the position set on the other and the mapping parameter for defining the function can be found.

In the correspondence-between-images detection method of the fifth aspect of the invention,
1. the error operation step calculates for a plurality of local areas into which an image is divided, the local area correspondence between two different images as an error and finds a displacement between the local areas reaching the minimum error and an error value in the proximity of the displacement.
2. Receiving the result, the error function operation step finds for each local area a quadratic error function having the maximum value zero with displacement as a variable from the displacement reaching the minimum error and the error value in the proximity of the displacement. Using the quadratic error function found for each local area and a predetermined weight, the weighted sum total of the quadratic error functions is again represented in a mapping parameter.
3. The recursive minimization step executes recursive minimization of the weighted sum total of the quadratic error functions for the mapping parameter for finding a parameter.
4. The weighting resetting step sets a value indirectly proportional to the value of the quadratic error function as the weight of the quadratic error function in the iteration process of the recursive minimization.

Thus, the correspondence between the two images is represented as the function for mapping the position set on one image to the position set on the other and the mapping parameter for defining the function can be found.

In the correspondence-between-images detection system of the sixth aspect of the invention,
1. the error operation means calculates for a plurality of local areas into which an image is divided, the local area correspondence between two different images as an error and finds a displacement between the local areas reaching the minimum error and an error value in the proximity of the displacement.
2. Receiving the result, the error function operation means finds for each local area a quadratic error function having the maximum value zero with displacement as a variable from the displacement reaching the minimum error and the error value in the proximity of the displacement. Using the quadratic error function found for each local area and a predetermined weight, the weighted sum total of the quadratic error functions is again represented in a mapping parameter.
3. The recursive minimization means executes recursive minimization of the weighted sum total of the quadratic error functions for the mapping parameter for finding a parameter.
4. The weighting resetting means sets a value indirectly proportional to the value of the quadratic error function as the weight of the quadratic error function in the iteration process of the recursive minimization.

Thus, the correspondence between the two images is represented as the function for mapping the position set on one image to the position set on the other and the mapping parameter for defining the function can be found.

In the correspondence-between-images detection method of the seventh aspect of the invention,
1. the error operation step calculates for a plurality of local areas into which an image is divided, the local area correspondence between two different images as an error and finds a displacement between the local areas reaching the minimum error and an error value in the proximity of the displacement.
2. Receiving the result, the error function operation step finds for each local area a quadratic error function with displacement as a variable from the displacement reaching the minimum error and the error value in the proximity of the displacement.
3. The error parameter conversion step again defines the sum total or partial sum of the quadratic error functions in a parameter for defining a function from the relationship between a line mapped and a displacement for determining the value of the quadratic error function.

The minimization step of minimizes the sum total or partial sum of the quadratic error functions again converted into the parameter for parameter and outputs the minimization parameter as motion between the images.

Thus, the correspondence between the two images is represented as the function for mapping the position set on one image to the position set on the other and the mapping parameter for defining the function can be found.

In the correspondence-between-images detection system of the eighth aspect of the invention,
1. the error operation means calculates for a plurality of local areas into which an image is divided, the local area correspondence between two different images as an error and finds a displacement between the local areas reaching the minimum error and an error value in the proximity of the displacement.
2. Receiving the result, the error function operation means finds for each local area a quadratic error function with displacement as a variable from the displacement reaching the minimum error and the error value in the proximity of the displacement.
3. The error parameter conversion means again defines the sum total or partial sum of the quadratic error functions in a parameter for defining a function from the relationship between a line mapped and a displacement for determining the value of the quadratic error function.

The minimization means minimizes the sum total or partial sum of the quadratic error functions again converted into the parameter for parameter and outputs the minimization parameter as motion between the images.

Thus, the correspondence between the two images is represented as the function for mapping the position set on one image to the position set on the other and the mapping parameter for defining the function can be found.

Referring now to the accompanying drawings, there are shown preferred embodiments of the invention. In the embodiments, two images made up of pixels sampled (with intensity converted into numeric values) are input. In the description of the embodiments to follow, one of the two images will be referred to as reference image and the other as comparison image and the coordinates in the comparison image mapped from the position of (x, y) in the reference image will be (x', y'). For easy understanding, each image consists of 240 pixels long and 352 pixels wide as the size of the image without lacking generality.

Figure 2:
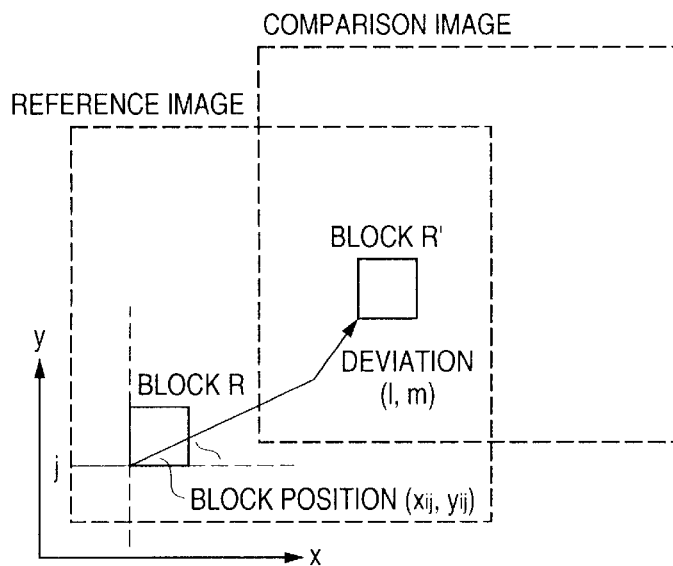
FIG. 2 is a schematic representation to show block matching.
Figure 3:
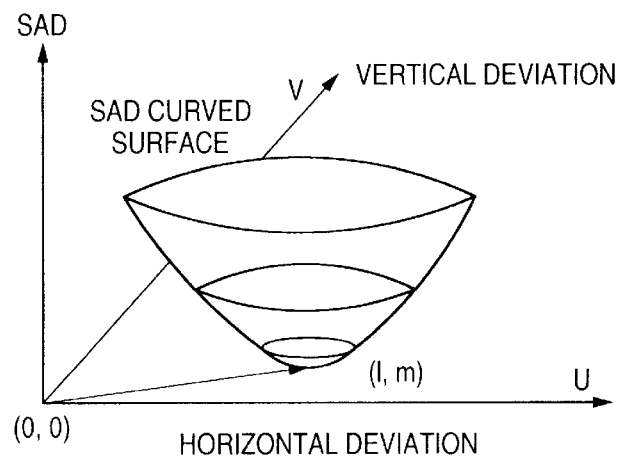
FIG. 3 is a schematic representation to show an error absolute sum of block matching and a quadratic error function.
Figure 4:
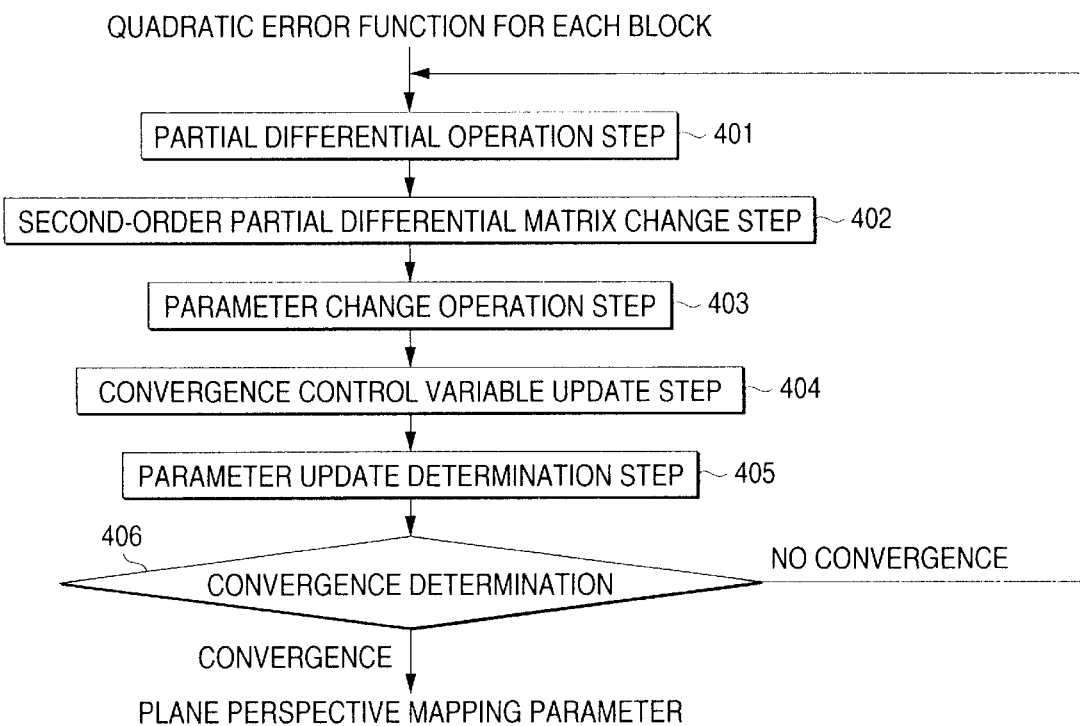
FIG. 4 is a step block diagram of a nonlinear iteractive minimization step with respect to planar perspective mapping parameter in the first embodiment of the invention.

An embodiment of a correspondence-between-images detection method of the invention (claim 1) will be discussed with reference to FIGS. 1 to 4 as a first embodiment of the invention. FIG. 1 is a step block diagram to represent the whole steps. FIG. 2 is a schematic representation of block matching. FIG. 3 is a schematic representation of an error absolute sum of block matching and a quadratic error function. FIG. 4 is a step block diagram of the nonlinear iteractive minimization step in FIG. 1.

In FIG. 1, numeral 101 denotes an error operation step based on block matching, numeral 102 denotes a quadratic error function approximation step with differential operator, and numeral 103 denotes a nonlinear iteractive minimization step with respect to planar perspective mapping parameter.

In FIG. 4, numeral 401 denotes a partial differential operation step, numeral 402 denotes a second-order partial differential matrix change step, numeral 403 denotes a parameter change operation step, numeral 404 denotes a convergence control variable update step, numeral 405 denotes a parameter update determination step, and numeral 406 denotes a convergence determination step.

The embodiment will be discussed according to the step block diagram of FIG. 1.

Error operation step based on block matching (101): As shown in FIG. 2, a search is made for displacement with the difference absolute sum (SAD) of intensity errors reaching the minimum from within the comparison image with respect to block R of 16×16 pixels in the reference image. The displacement can be obtained as (u, v) minimizing expression 18.

$$SAD(u, v) = \sum_{(x,y)\in R} |I'(x+u, y+v) - I(x, y)| \quad (18)$$

Deviation (l, m) minimizing expression 18 and SAD in the proximity of (l, m) obtained secondarily as the result of the search are found as expression 19.

$$S=(SAD(l-1,m-1),SAD(l-1,m),SAD(l-1,m+1),SAD(l,m-1),SAD(l,m),SAD(l,m+1),SAD(l+1,m-1),SAD(l+1,m),SAD(l+1,m+1))' \quad (19)$$

Block matching is executed every block consisting of 16 pixels long and 16 pixels wide of the reference image. Since the image consists of 240 pixels long and 352 pixels wide as the image size, the minimum displacement and the SAD in the proximity of the displacement in expression 19 are found for 330 block positions.

Quadratic error function approximation step with differential operator (102): Assume that the SAD forms a parabolic surface like a bowl with the displacement neighborhood reaching the minimum value as the bottom, as shown in FIG. 3. This curved surface is approximated to a quadratic function and is represented in expression 20.

i, j denotes the horizontally ith, vertically jth block and (lij, mij) is the SAD minimum displacement in the block, whereby converting the SAD into a function with the displacement as a variable can be executed.

$$E_{i,j}(u, v) = SAD_{i,j}(u, v) - \text{the minimum of } SAD_{i,j} \quad (20)$$

$$= E_{ij}^{\text{offset}} + (u - l_{ij})\frac{\partial E_{ij}}{\partial u} + (v - m_{ij})\frac{\partial E_{ij}}{\partial v} +$$

$$\frac{(u - l_{ij})^2}{2}\frac{\partial^2 E_{ij}}{\partial u^2} + (u - l_{ij})(v - m_{ij})\frac{\partial^2 E_{ij}}{\partial u \partial v} +$$

$$\frac{(v - m_{ij})^2}{2}\frac{\partial^2 E_{ij}}{\partial v^2}$$

The coefficients shown in expression 20 are found as follows: The SAD in the proximity of (l, m) with the displacement (l, m) minimizing expression 18 as the center is already found as expression 19 in the error operation step based on block matching. It is used to find the coefficients in expression 20 in inner product operations of expressions 21 to 25. The inner product operations are up-and-down, right-to-left, and slant difference operations in the image space.

$$\frac{\partial E(u, v)}{\partial u}\bigg|(u, v) = (l, m) = \frac{1}{6}(-1, 0, 1, -1, 0, 1, -1, 0, 1)S \quad (21)$$

$$\frac{\partial E(u, v)}{\partial v}\bigg|(u, v) = (l, m) = \frac{1}{6}(-1, -1, -1, 0, 0, 0, 1, 1, 1)S \quad (22)$$

$$\frac{\partial^2 E(u, v)}{\partial u^2}\bigg|(u, v) = (l, m) = \frac{1}{3}(1, -2, 1, 1, -2, 1, 1, -2, 1)S \quad (23)$$

$$\frac{\partial E(u, v)}{\partial v^2}\bigg|(u, v) = (l, m) = \frac{1}{3}(1, 1, 1, -2, -2, -2, 1, 1, 1)S \quad (24)$$

$$\frac{\partial E(u, v)}{\partial u \partial v}\bigg|(u, v) = (l, m) = \frac{1}{4}(1, 0, -1, 0, 0, 0, -1, 0, 1)S \quad (25)$$

The offset value of expression 20 is found according to expression 26. Expression 20 takes the minimum value 0 based on the offset.

$$E_{ij}^{\text{offset}} = \frac{\frac{\partial^2 E_{ij}}{\partial v^2}\left(\frac{\partial E_{ij}}{\partial u}\right)^2 - 2\frac{\partial^2 E_{ij}}{\partial u \partial v}\frac{\partial E_{ij}}{\partial u}\frac{\partial E_{ij}}{\partial v} + \frac{\partial^2 E_{ij}}{\partial u^2}\left(\frac{\partial E_{ij}}{\partial v}\right)^2}{2\left(\frac{\partial^2 E_{ij}}{\partial u^2}\frac{\partial^2 E_{ij}}{\partial v^2} + \left(\frac{\partial^2 E_{ij}}{\partial u^2}\right)^2\right)} \quad (26)$$

Expression 27 exists as the condition that expression 20 takes the minimum value.

$$\frac{\partial^2 E_{ij}}{\partial u^2}\frac{\partial^2 E_{ij}}{\partial v^2} - \left(\frac{\partial^2 E_{ij}}{\partial u^2}\right)^2 > 0 \quad (27)$$

In all embodiments described in the specification, the block matching results not satisfying expression 27 are not used for mapping parameter estimation. In the first embodiment, the block matching results not satisfying expression 27 for the 330 block positions are excluded for finding the quadratic function shown in expression 20.

Nonlinear iteractive minimization step with respect to planar perspective mapping parameter (103): The SAD is represented as the function with the displacement at each block position as a variable according to expression 20. The sum of the SADs on the whole screen can be represented for planar perspective mapping parameter p from the relationship between expressions 7 and 20. It is shown in expression 28.

$$E(p) = \sum_{i,j} E_{i,j}(f(x_{ij}; p) - x_{ij}) \quad (28)$$

In expression 28, (xij, yij) is the center position of the block i, j (see FIG. 2). p minimizing expression 28 is the mapping parameter to be found. The step configuration for executing it is shown in FIG. 4 and will be discussed.

Partial differential operation step (401): For expression 28, first-order partial differential vector g and second-order partial differential matrix H are calculated as shown expressions 29 and 30. Expression 28 is defined as the sum of quadratic functions Eij and thus second-order partial differential is possible for expression 28.

$$g = \left( \frac{\partial E}{\partial p_0} \quad \frac{\partial E}{\partial p_1} \quad \frac{\partial E}{\partial p_2} \quad \frac{\partial E}{\partial p_3} \quad \frac{\partial E}{\partial p_4} \quad \frac{\partial E}{\partial p_5} \quad \frac{\partial E}{\partial p_6} \quad \frac{\partial E}{\partial p_7} \right)^t, \quad (29)$$

$$H = \begin{pmatrix} \frac{\partial^2 E}{\partial p_0^2} & \frac{\partial^2 E}{\partial p_0 \partial p_1} & \cdots & \frac{\partial^2 E}{\partial p_0 \partial p_7} \\ \frac{\partial^2 E}{\partial p_1 \partial p_0} & \frac{\partial^2 E}{\partial p_1^2} & \cdots & \frac{\partial^2 E}{\partial p_1 \partial p_7} \\ \vdots & \vdots & \ddots & \vdots \\ \frac{\partial^2 E}{\partial p_7 \partial p_0} & \frac{\partial^2 E}{\partial p_7 \partial p_1} & \cdots & \frac{\partial^2 E}{\partial p_7^2} \end{pmatrix} \quad (30)$$

Second-order partial differential matrix change step (402): As shown in expression 31, diagonal matrix AbsoluteDiag (H) provided by converting the diagonal elements of the second-order partial differential matrix H into absolute values and multiplying by $\lambda$ is added to the second-order partial differential matrix H to produce Hd. Element dij of the diagonal matrix AbsoluteDiag (H) is given in expression 32. In expression 32, hij is an element of the matrix H. The initial value of $\lambda$ is 1.0.

$$H_d = H + \lambda \text{AbsoluteDiag}(H), \quad (31)$$

$$d_{ij} = \begin{cases} |h_{ij}| & i = j \text{ or} \\ 0 \end{cases} \quad (32)$$

Parameter change operation step (403): Mapping parameter change $\delta p$ is calculated according to expression 33 and the next mapping parameter candidate p is found according to expression 34.

$$\delta p = H_d^{-1} g \quad (33)$$

$$p' = p - \delta p \quad (34)$$

Convergence control variable update step (404): The minimization component provided by setting the mapping parameter to p' is calculated according to expression 35. On the other hand, an ideal minimization component provided if expression 28 is assumed to be a quadratic function of the mapping parameter p is calculated according to expression 36. If the value of expression 35 is close to that of expression 36, efficient estimation conforming to the Newton's method can be executed.

Thus, if the ratio of expression 35 to expression 36 exceeds 0.7, $\lambda$ is halved. In contrast, if the ratio of expression 35 to expression 36 falls below 0.3, $\lambda$ is doubled.

$$e_{real} = E(p) - E(p') \quad (35)$$

$$e_{ideal} = g^t \delta p + \frac{1}{2} \delta p' H \delta p \quad (36)$$

Parameter update determination step (405): If expression 35 is positive, p' is updated as p.

Convergence determination step (406): If the conditional expression of expression 37 is satisfied or the number of repetitions exceeds 100, p is output as the result; otherwise, the current $\lambda$ and p are held and the steps are again repeated starting at the partial differential operation step.

$$|p' - p| < 0.0001 \quad (37)$$

Thus, according to the embodiment, the mapping parameter and the SAD for each of the blocks into which an image is divided are related to each other and the sum total of the SADS is minimized for the mapping parameter, whereby the correspondence between images is detected.

Specifically, the fact is used that expression 28 is defined as the sum of the quadratic functions of the displacements at block positions and that the displacement at each block position is determined from the mapping parameter and the block position.

Therefore, if the displacement at each block position is a mapping for which first-order partial differential is possible for the mapping parameter, parameter estimation can be executed by the method shown in the first embodiment. At the second-order partial differential matrix change step (402) of the embodiment, the diagonal matrix AbsoluteDiag (H) provided by converting the diagonal elements into absolute values and multiplying by $\lambda$ is added to the original second-order partial differential matrix H.

It is performed for executing stable parameter estimation with the second-order partial differential matrix as a positive definite matrix. In the Levenberg-Marquart method shown in the example in the related art, it is guaranteed that the matrix A shown in expression 14 is a positive definite matrix for approximating a second-order partial differential matrix as a product of first-order partial differential vector for finding the second-order partial differential matrix. It is not guaranteed for the matrix H in the method shown in the embodiment, thus the technique different from the Levenberg-Marquart method is used to stable nonlinear minimization.

Not only the SAD, but also square error sum SSD shown in expression 38 and correlation coefficient COR shown in expression 39 may be used depending on the application.

The initial value of the parameter p is required for the nonlinear iteractive minimization step with respect to planar perspective mapping parameter; in the embodiment, p=(1, 0, 0, 0, 1, 0, 0, 0).

Generally, it is said that the convergence result of nonlinear minimization depends on the initial value. Also in the embodiment, the obtained result may differ depending on the initial value. Thus, stable obtaining of the initial value becomes a problem. A method for overcoming the problem will be discussed in a third embodiment of the invention.

$$SSD(u, v) = \sum_{(x,y) \in R} [I'(x+u, y+v) - I(x, y)]^2 \quad (38)$$

$$COR(u, v) = \frac{\sum_{(x,y) \in R} I'(x+u, y+v) I(x, y)}{\sqrt{\sum_{(x,y) \in R} I'(x+u, y+v)} \sqrt{\sum_{(x,y) \in R} I(x, y)^2}} \quad (39)$$

Figure 5:
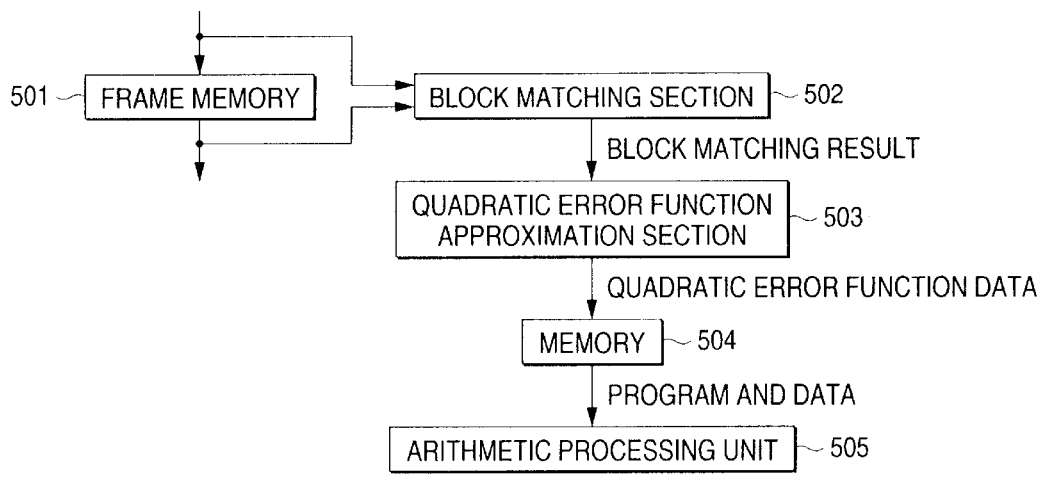
FIG. 5 is a block diagram of a correspondence-between-images detection system common to second, fourth, sixth, and eighth embodiments.

Next, an embodiment of a correspondence-between-images detection system of the invention (claim 2) installing the correspondence-between-images detection method shown in the first embodiment will be discussed with reference to FIG. 5 as a second embodiment of the invention. In FIG. 5, numeral 501 denotes frame memory for delaying an image one frame, numeral 502 denotes a block matching section, numeral 503 denotes a quadratic error function approximation section, numeral 504 denotes memory, and numeral 505 denotes an arithmetic processing unit.

An image is delayed one frame in the frame memory (501), whereby the correspondence-between-images detection system detects the correspondence between the preceding and following frames of a moving image in time sequence.

The operation of the block matching section (502) is the same as that of the error operation step based on block matching (101) in the first embodiment. The operation of the quadratic error function approximation section (503) is the same as that of the quadratic error function approximation step with differential operator (102) in the first embodiment. The result is written into the memory (504).

In the embodiment, the nonlinear iterative minimization step with respect to planar perspective mapping parameter (103) shown in the first embodiment is executed in the arithmetic processing unit (505) according to a program. In the second embodiment, the correspondence-between-images detection method shown in the first embodiment has been shown as the system.

Next, an embodiment of a correspondence-between-images detection method corresponding to the invention (claim 3) will be discussed with reference to FIG. 6, which is a step block diagram of the correspondence-between-images detection method, which will be hereinafter referred to as third embodiment. In the third embodiment, like the first embodiment, planar perspective mapping parameter is detected as image correspondence.

Figure 6:
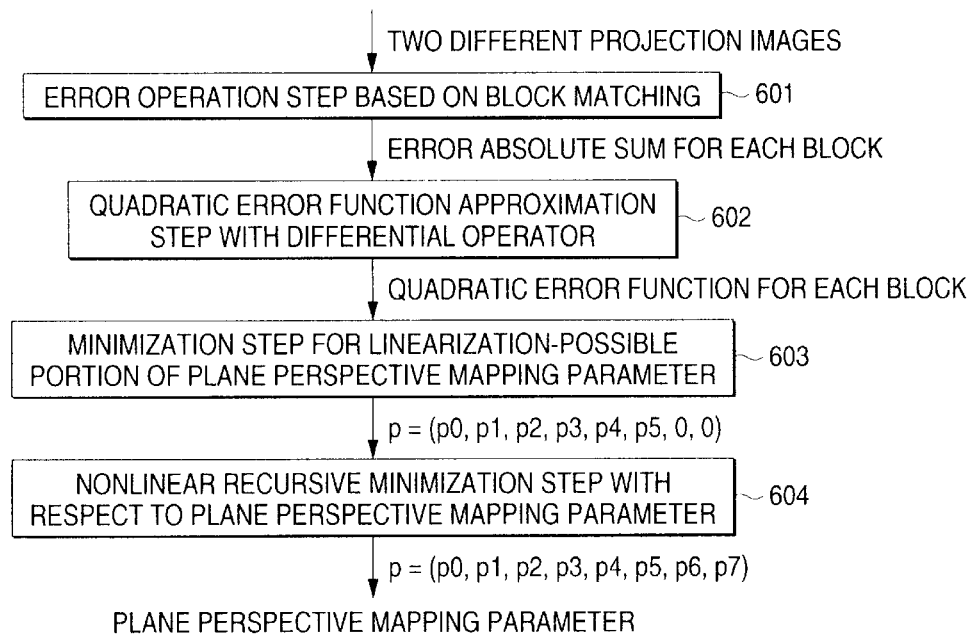
FIG. 6 is a step block diagram of a correspondence-between-images detection method in a third embodiment of the invention.

In FIG. 6, numeral 601 denotes an error operation step based on block matching, numeral 602 denotes a quadratic error function approximation step with differential operator, numeral 603 denotes a minimization step for linearization-possible portion of planar perspective mapping parameter, and numeral 604 denotes a nonlinear iterative minimization step with respect to planar perspective mapping parameter.

In FIG. 6, the contents and input/output of the error operation step based on block matching (601), the quadratic error function approximation step with differential operator (602), and the nonlinear iterative minimization step with respect to planar perspective mapping parameter (604) are the same as those in the first embodiment and therefore will not be discussed again.

An initial value is required for estimation of the planar perspective mapping parameter, which becomes a problem in the first embodiment. Then, the minimization step for the linearization-possible portion of the planar perspective mapping parameter is newly added to the third embodiment.

If p6 and p7 in the planar perspective mapping shown in expression 7 are fixed to zero, it is seen that the planar perspective mapping is the same as the two-dimensional affine mapping shown in expressions 1 to 3. That is, the two-dimensional affine mapping is one limited mapping of the planar perspective mapping. Then, if parameter of the two-dimensional affine mapping shown in expressions 1 to 3 is found and then the nonlinear iterative minimization step with respect to planar perspective mapping parameter is performed with the initial value set to p=(a0, a1, a2, a3, a4, a5, 0, 0) from the found parameter a=(a0, a1, a2, a3, a4, a5), more accurate parameter estimation can be expected, because in mapping between different projection images, normally, parallel move, rotation, and enlargement are predominant and often p2, p5>>p0−1.0, p1, p3, p4−1.0,>>p6, p7−0.0.

A procedure of finding parameter a=(a0, a1, a2, a3, a4, a5) of the two-dimensional affine mapping will be discussed.

Minimization step for linearization-possible portion of planar perspective mapping parameter (603): The minimization target is expression 40.

$$E(a) = \sum_{i,j} E_{i,j}(P_a(x_{ij})a - x_{ij}) \quad (40)$$

An Euler condition that first-order partial differential becomes a zero vector is used as a condition that expression 40 has the minimum value for the parameter a of the two-dimensional affine mapping. It is shown in expression 41.

$$\frac{\partial \sum_{i,j} E_{i,j}(P_a(x_{ij})a - x_{ij})}{\partial a} = 0 \quad (41)$$

Since expression 40 is a quadratic for the parameter a, expression 41 becomes linear simultaneous equations represented in expression 42, where matrix Aa and row vector ba are represented in expressions 43 to 45.

$$A_a a - b_a = 0 \quad (42)$$

$$A_a = \sum_{ij} \left( P_a(x_{i,j})' \begin{pmatrix} \frac{\partial^2 E_{ij}}{\partial u^3} & \frac{\partial^3 E_{ij}}{\partial u \partial v} \\ \frac{\partial^2 E_{ij}}{\partial u \partial v} & \frac{\partial^2 E_{ij}}{\partial v^2} \end{pmatrix} P_a(x_{i,j}) \right) \quad (43)$$

$$b_a = \sum_{ij} P_a(x_{i,j})' r_{i,j} \quad (44)$$

$$r_{i,j} = \begin{pmatrix} -\frac{\partial E_{ij}}{\partial u} + \frac{\partial^2 E_{ij}}{\partial u^2}(l_{ij} - x_{ij}) + \frac{\partial^2 E_{ij}}{\partial u \partial v}(m_{ij} - y_{ij}) \\ -\frac{\partial E_{ij}}{\partial v} + \frac{\partial^2 E_{ij}}{\partial u^2}(m_{ij} - y_{ij}) + \frac{\partial^2 E_{ij}}{\partial u \partial v}(l_{ij} - x_{ij}) \end{pmatrix} \quad (45)$$

In the invention (claim 3), the "linear-minimization-possible parameter with a partial derivative for parameter becoming a linear function" refers to such a parameter where linear simultaneous equations can be obtained according to Euler condition. From the linear simultaneous equations of expression 42, the parameter a of the two-dimensional affine mapping can be obtained without recursion according to expression 46.

$$a = A_a^{-1} b_a \quad (46)$$

In the embodiment, the obtained parameter a of the two-dimensional affine mapping is assigned to the planar perspective mapping parameter p to provide an initial value and the nonlinear iterative minimization step with respect to planar perspective mapping parameter (604) is performed in the same manner as in the first embodiment.

Next, the correspondence-between-images detection method shown in the third embodiment can be installed as a correspondence-between-images detection system as in the first embodiment. To do this, the program executed in the arithmetic processing unit (505) in the second embodiment may be replaced with the minimization step for linearization-possible portion of planar perspective mapping parameter (603) and the nonlinear iterative minimization step with respect to planar perspective mapping parameter (604) in FIG. 6 as a fourth embodiment of the invention.

Next, an embodiment of a correspondence-between-images detection method corresponding to the invention (claim 5) will be discussed with reference to FIG. 7, which is a step block diagram of the correspondence-between-images detection method.

Figure 7:
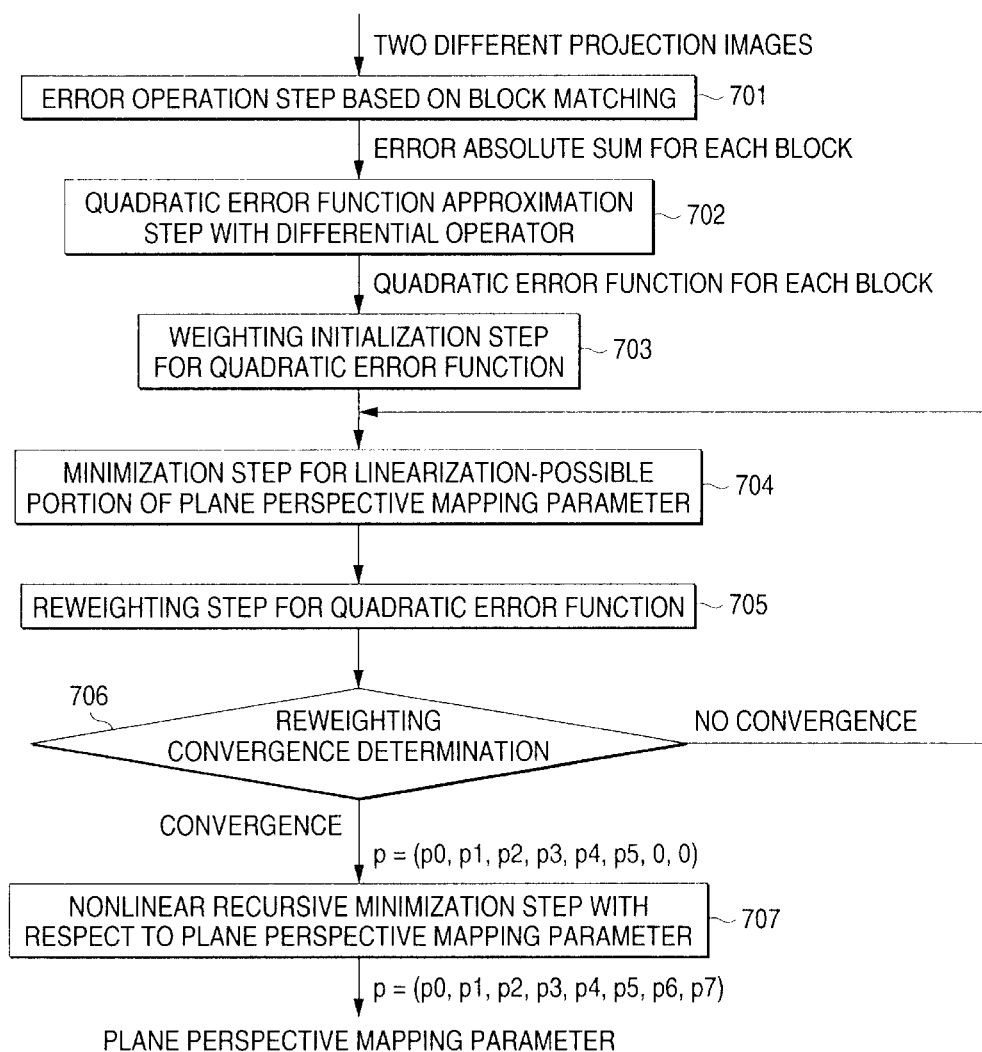
FIG. 7 is a step block diagram of a correspondence-between-images detection method in a fifth embodiment of the invention.

In FIG. 7, numeral 701 denotes an error operation step based on block matching, numeral 702 denotes a quadratic error function approximation step with differential operator, numeral 703 denotes a weighting initialization step for quadratic error function, numeral 704 denotes a weighting minimization step for linearization-possible portion of planar perspective mapping parameter, numeral 705 denotes a reweighting step for quadratic error function, numeral 706 denotes a weighting convergence determination step, and numeral 707 denotes a nonlinear iterative minimization step with respect to planar perspective mapping parameter.

Hereinafter, the embodiment of the correspondence-between-images detection method will be adopted as a fifth embodiment of the invention. In the fifth embodiment, the minimization step for linearization-possible portion of planar perspective mapping parameter (603) in the third embodiment is replaced with a loop of the weighting initialization step for quadratic error function (703), the weighting minimization step for linearization-possible portion of planar perspective mapping parameter (704), the reweighting step for quadratic error function (705), and the weighting convergence determination step (706). Other steps are the same as those in the third embodiment and therefore will not be discussed again.

In the third embodiment, first the two-dimensional affine mapping parameter is found by minimizing expression 40. The sum of 330 quadratic functions Eij is to be minimized (however, those not satisfying expression 27 are excluded). There is a possibility that they may contain those obtained from an erroneous correspondence position by block matching and belonging to a different mapping parameter. Then, the sum provided by weighting Eij shown in expression 47 is minimized. In expression 47, wij is a weight and takes a value of [0, 1].

$$E(a) = \sum_{i,j} w_{ij} E_{i,j}(P_a(x_{ij})a - x_{ij}) \quad (47)$$

Weighting initialization step for quadratic error function (703): The value 1.0 is assigned to all wij.

Weighting minimization step for linearization-possible portion of planar perspective mapping parameter (704): If wij is assumed to be a constant, the Euler condition shown in expression 48 is solved as in the third embodiment, whereby the weighting minimization step can be executed for the two-dimensional affine mapping parameter.

$$\frac{\partial \sum_{i,j} w_{ij} E_{i,j}(P_a(x_{ij})a - x_{ij})}{\partial a} = 0 \quad (48)$$

Calculation of expressions 49 to 52 is executed for finding the two-dimensional affine mapping parameter.

$$A_w a - b_w = 0 \quad (49)$$

$$A_w = \sum_{ij} \left( w_{ij} P_a(x_{i,j})' \begin{pmatrix} \frac{\partial^2 E_{ij}}{\partial u^2} & \frac{\partial^2 E_{ij}}{\partial u \partial v} \\ \frac{\partial^2 E_{ij}}{\partial u \partial v} & \frac{\partial^2 E_{ij}}{\partial v^2} \end{pmatrix} P_a(x_{i,j}) \right) \quad (50)$$

$$b_w = \sum_{ij} w_{ij} P_a(x_{ij})' r_{i,j} \quad (51)$$

$$a = A_w^{-1} b_w \quad (52)$$

Reweighting step for quadratic error function (705): Based on the found two-dimensional affine mapping parameter, δ shown in expression 53 is calculated. The weight is again calculated according to expression 54. In expression 54, CR is a multiplier by which δ is multiplied; it is 3.0 in the embodiment.

$$\sigma = \sqrt{\frac{\sum_{i,j} w_{ij} E_{i,j}(P_a(x_{ij})a - x_{ij})}{\sum_{i,j} w_{ij}}} \quad (53)$$

$$w_{ij} = \begin{cases} \left(1 - \frac{E_{i,j}(\ )}{(c_R \sigma)^2}\right)^2 & \sqrt{E_{ij}(\ )} \leq c_R \\ 0 \end{cases} \quad (54)$$

Weighting convergence determination step (706): If the number of repetitions does not exceed five, the steps are again repeated starting at the weighting minimization step for linearization-possible portion of planar perspective mapping parameter.

If the number of repetitions exceeds five, control goes to the nonlinear iteractive minimization step with respect to the next planar perspective mapping parameter.

The fact that it is guaranteed that Eij has the minimum value 0 according to the definition of expression 20 has a large significance in the weight minimization. As seen from expression 54, wij takes the value [0, 1].

According to the embodiment, the weight of Eij having a large value is lessened, whereby if an image contains different two-dimensional affine mappings or the block matching contains an error, it can be overcome. If an image contains different two-dimensional affine mappings, a predominant mapping parameter concerning motion of the whole image, namely, a parameter of the mapping to which a larger number of quadratic functions Eij belong is obtained.

In the embodiment, the reweighting step for quadratic error function is executed based on expression 54, but the above-described advantage can be expected if any other weighting, for example, expression 55 or even simpler expression 56 is adopted. Although δ is estimated based on simple weighted addition mean, a robust statistical technique for estimating δ from the median or the like can also be adopted.

$$w_{ij} = \begin{cases} 1.0 & \sqrt{E_{i,j}(\ )} \leq c_R \\ \frac{c_R \sigma}{\sqrt{E_{i,j}(\ )}} \end{cases} \quad (55)$$

$$w_{ij} = \begin{cases} 1.0 & \sqrt{E_{ij}(\ )} \leq c_R \\ 0.0 \end{cases} \quad (56)$$

Next, the correspondence-between-images detection method shown in the fifth embodiment can be installed as a correspondence-between-images detection system as in the first embodiment. To do this, the program executed in the arithmetic processing unit (505) in the second embodiment may be replaced with the weighting initialization step for quadratic error function (703), the weighting minimization step for linearization-possible portion of planar perspective mapping parameter (704), the reweighting step for quadratic error function (705), the weighting convergence determination step (706), and the nonlinear iteractive minimization step with respect to planar perspective mapping parameter (707) in FIG. 7 as a sixth embodiment of the invention.

Next, a seventh embodiment of correspondence-between-images detection method of the invention (claim 7) will be discussed. In the embodiment, a correspondence-between-images detection method for finding an epipolar mapping parameter is shown.

Figure 9:
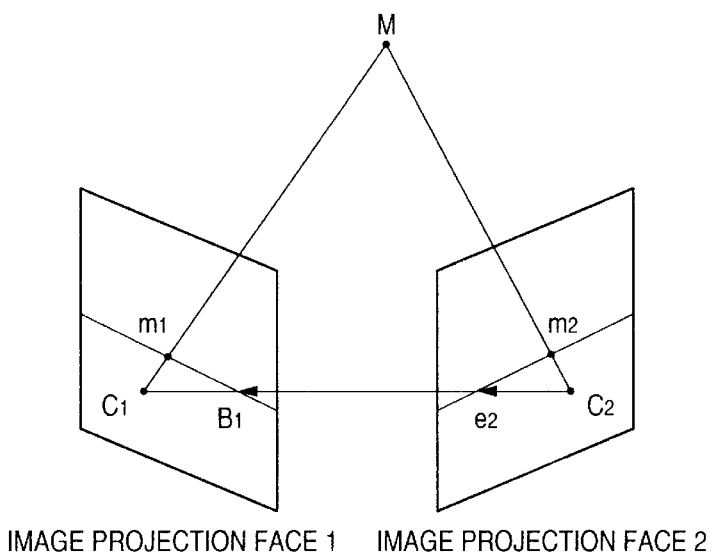
FIG. 9 is a schematic representation to show epipolar geometry.

First, an epipolar mapping will be discussed with reference to FIGS. 9 and 10. FIG. 9 is a schematic representation to describe epipolar geometry on the assumption that an ideal pinhole camera is used. In FIG. 9, C1 and C2 denote the optical centers of the camera at different positions, M denotes a feature point of an object surface whose photo is taken, m1 and m2 denote projection positions of the object positions onto images, and e1 and e2 denote positions where the optical centers are projected to their respective images, called epipoles.

As seen in FIG. 9, the feature point of the object surface whose photo is taken, M, and the two optical centers of the camera, C1 and C2, form a plane. The line where the plane cuts the projection image face is called an epipolar.

The projection point m2 corresponding to the projection point m1 of the feature point M always exists on line e2-m2, namely, the epipolar of the projection image face, which is represented by the generalized epipolar mapping previously described in the related art (expressions 9 and 10).

Expression 9 describes that a point is mapped to a line, which is not strict representation of the epipolar geometry shown in FIG. 9.

Since all points on the plane M-C1-C2 are projected to epipolars e1-m1 and e2-m2, more strictly the epipolar e1-m1 is mapped to the epipolar e2-m2.

Figure 10:
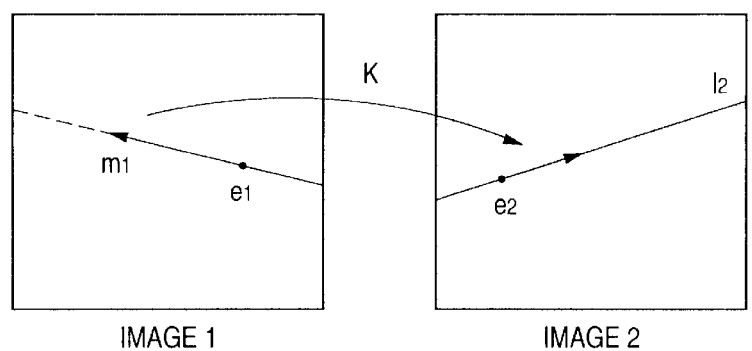
FIG. 10 is a schematic representation to show an epipolar mapping.

It is shown in FIG. 10. The relationship is represented by expressions 57 to 60.

$$l_2: e_2 + sK(m_1 - e_1) \tag{57}$$

$$e_1 = (x_{e1}, y_{e1})^T \tag{58}$$

$$e_2 = (x_{e2}, y_{e2})^T \tag{59}$$

$$K = \begin{pmatrix} k_1 & 1 \\ k_2 & k_3 \end{pmatrix} \tag{60}$$

In expression 57, s denotes an arbitrary real number for representing a line. Expression 57 represents an epipolar mapping for converting the line e1-m1 in K and moving the line e2.

As seen from expressions 58 to 60, the epipolar mapping is described with four parameters concerning the epipolars and three parameters concerning the matrix K (seven parameters in total). Representation of the fundamental matrix F of expression 9 using the relationship results in expression 61.

$$F(e_1, e_2, K) = \begin{pmatrix} k_2 & k_1 & -(k_1 y_{e2} + k_2 x_{e2}) \\ -1 & -k_3 & k_3 y_{e2} + x_{e2} \\ (y_{e1} - k_2 x_{e1}) & (k_3 y_{e1} - k_1 x_{e1}) & -(k_3 y_{e2} + x_{e3}) y_{e1} + (k_1 y_{e2} + k_2 x_{e2}) x_{e1} \end{pmatrix} \tag{61}$$

If the fundamental matrix is used for executing the mapping of expression 9, not only mapping from a point to a line, but also mapping from one epipolar to another shown in FIG. 10 is also guaranteed.

In other words, if an arbitrary regular matrix with the number of mapping parameters as nine is used for expression 7, the mapping from a point to a line is represented, but the mapping from a line to a line is not guaranteed.

In this sense, the generalized epipolar mapping (expressions 9 and 10) does not use strict epipolar geometry restraint.

Figure 8:
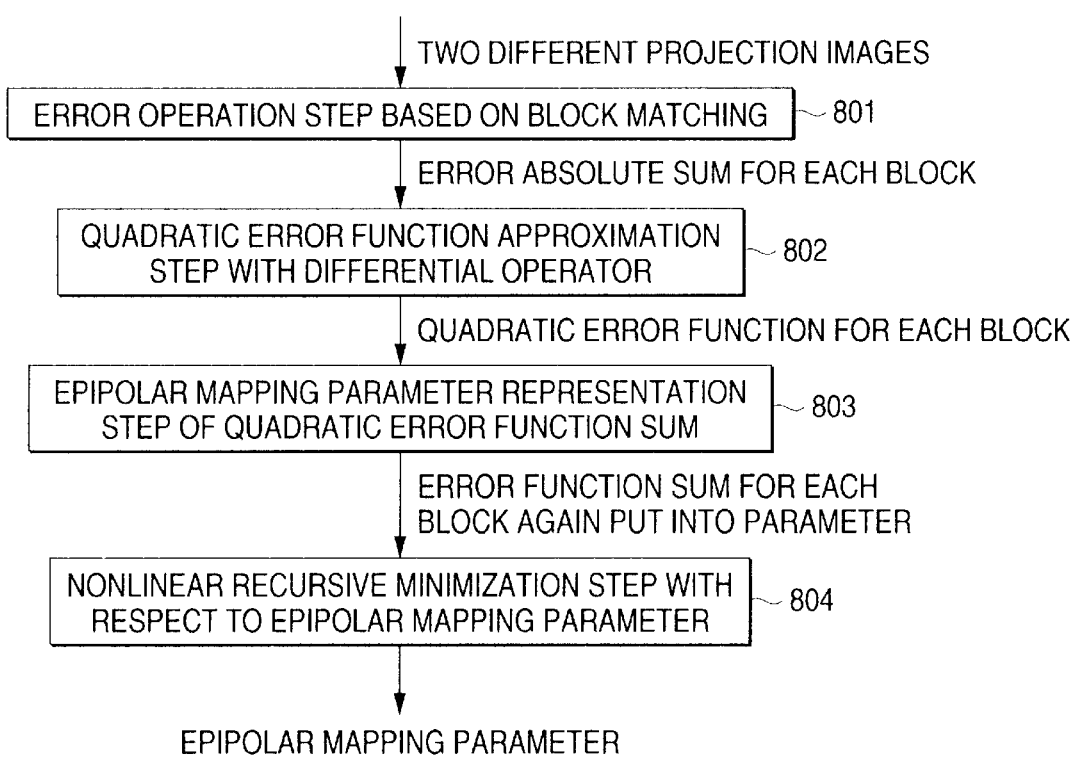
FIG. 8 is a step block diagram of a correspondence-between-images detection method in a seventh embodiment of the invention.

Next, a processing procedure of the embodiment will be discussed with reference to FIGS. 8 and 12. FIG. 8 a step block diagram of the correspondence-between-images detection method.

In FIG. 8, numeral 801 denotes an error operation step based on block matching, numeral 802 denotes a quadratic error function approximation step with differential operator, numeral 803 denotes an epipolar mapping parameter representation step of quadratic error function sum, and numeral 804 denotes a nonlinear iterative minimization step with respect to epipolar mapping parameter.

The error operation step based on block matching (801) and the quadratic error function approximation step with differential operator (802) in FIG. 8 are the same as those in the first embodiment and therefore will not be discussed again. Here, the epipolar mapping parameter representation step of quadratic error function sum (803) and the nonlinear iterative minimization step with respect to epipolar mapping parameter (804) will be discussed.

Epipolar mapping parameter representation step of quadratic error function sum (803): Since mapping from a point to a point is handled in the first to sixth embodiments, the displacement obtained from mapping parameter is assigned to input of quadratic error function obtained, whereby the quadratic error function sum can be easily represented in mapping parameter.

Figure 11:
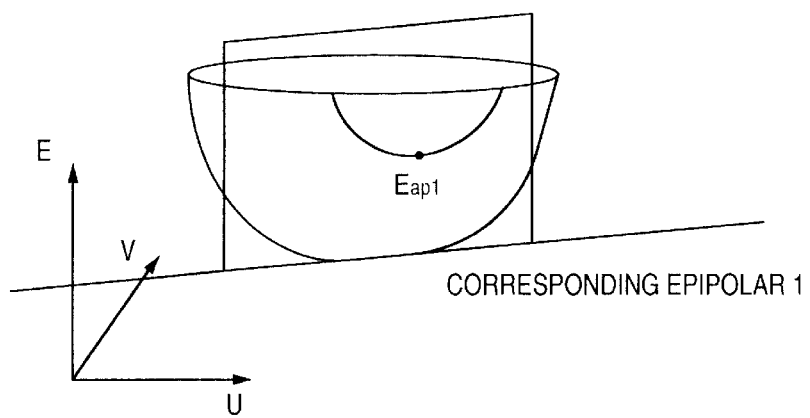
FIG. 11 is a schematic representation to show an epipolar and a quadratic error function.

To handle mapping from a point to a line in the seventh embodiment, representation is made as the function sum for representing the quadratic error function value taking the minimum value at an arbitrary point on the line mapped from a block position of a reference image. For intuitive understanding, a description will be given with FIG. 11.

An SAD quadratic surface as shown in FIG. 6 is represented with respect to each block position by executing the quadratic error function approximation step with differential operator (802).

Since the displacement is restrained on epipolar I by epipolar mapping, the quadratic error function value is restrained on a quadratic curve obtained by cutting the SAD quadratic surface on the plane passing through the epipolar 1 vertically. To uniquely define the quadratic error function value, the minimum value on the quadratic curve is defined as an error value.

To simplify representation, the quadratic error function of expression 20 is again represented in expression 62. The coeffecients of expression 62 are given in expressions 63 to 68.

$$E_{i,j}(u,v) = E_1 + E_2 u + E_3 v + E_4 u^2 + E_5 v^2 + E_6 uv \tag{62}$$

$$E_1 = E_{ij}^{offset} - \frac{\partial E_{ij}}{\partial u} l - \frac{\partial E_{ij}}{\partial v} m + \frac{\partial^2 E_{ij}}{\partial u^2} \frac{l}{2} + \frac{\partial^2 E_{ij}}{\partial v^2} \frac{m}{2} + \tag{63}$$

$$\frac{\partial^2 E_{ij}}{\partial u \partial v} lm$$

$$E_2 = \frac{\partial E_{ij}}{\partial u} - \frac{\partial^2 E_{ij}}{\partial u^2} l - \frac{\partial^2 E_{ij}}{\partial u \partial v} m \tag{64}$$

$$E_3 = \frac{\partial E_{ij}}{\partial u} - \frac{\partial^2 E_{ij}}{\partial v^2} l - \frac{\partial^2 E_{ij}}{\partial u \partial v} l \tag{65}$$

$$E_4 = \frac{\partial^2 E_{ij}}{\partial u^2} \frac{1}{2} \tag{66}$$

-continued $$E_5 = \frac{\partial^2 E_{ij}}{\partial v^2} \frac{1}{2} \tag{67}$$

$$E_6 = \frac{\partial^2 E_{ij}}{\partial u \partial v} \tag{68}$$

Here, the fact that the displacement (u, v) in each quadratic error function is restrained on a line is represented by expression 69, which is a restraint expression of the displacement corresponding to the horizontally, vertically (i, j)th block. It can be found according to expression 70 by epipolar mapping (see expression 9).

$$a_{ij}u + b_{ij}v + c_{ij} = 0 \tag{69}$$

$$\begin{pmatrix} a_{ij} \\ b_{ij} \\ c_{ij} \end{pmatrix} = F(e_1, e_2, K) \tilde{x}_{ij} \tag{70}$$

With expression 69 given, the displacement u wherein expression 62 has the minimum value can be calculated as expression 71.

$$u = \frac{-b_{ij}^2 E_2 + a_{ij} b_{ij} E_3 - 2 a_{ij} c_{ij} E_5 + b_{ij} c_{ij} E_6}{2(b_{ij}^2 E_4 + a_{ij}^2 E_5 - a_{ij} b_{ij} E_6)} \tag{71}$$

If expressions 71 and 69 are assigned to expression 62, the error function for each block can be given in expression 72. The coefficients of expression 72 are given in expressions 73 to 81.

$$E_{i,j}^{epi} = \frac{G_1 a_{ij}^2 + G_2 b_{ij}^2 + G_3 c_{ij}^2 + G_4 a_{ij} b_{ij} + G_5 b_{ij} c_{ij} + G_6 a_{ij} c_{ij}}{G_7 a_{ij}^2 + G_8 a_{ij} b_{ij} + G_9 b_{ij}^2} \tag{72}$$

$$G_1 = (4 E_2 E_3 - E_3^2) \tag{73}$$

$$G_2 = (4 E_1 E_4 - E_2^2) \tag{74}$$

$$G_3 = (4 E_4 E_5 - E_6^2) \tag{75}$$

$$G_4 = -(4 E_1 E_6 - 2 E_2 E_3) \tag{76}$$

$$G_5 = -(4 E_3 E_4 - 2 E_2 E_6) \tag{77}$$

$$G_6 = -(4 E_2 E_5 - 2 E_3 E_6) \tag{78}$$

$$G_7 = 4 E_5 \tag{79}$$

$$G_8 = -4 E_6 \tag{80}$$

$$G_9 = 4 E_4 \tag{81}$$

From the epipolar mapping parameter and the block position (xij, yij), (aij, bij, cij) is defined and expression 72 is obtained.

Nonlinear iteractive minimization step with respect to epipolar mapping parameter (804): The minimization target is expression 82. Since the first-order partial differential function with respect to the epipolar mapping parameter shown in expression 83 is not a linear function, parameter estimation is made by nonlinear iteractive miniaturization as in the first embodiment.

$$E^{epi}(q) = E^{epi}(e_i, e_2, K) = \sum_{i,j} E_{i,j}^{epi}(e_i, e_2, K) \tag{82}$$

Figure 12:
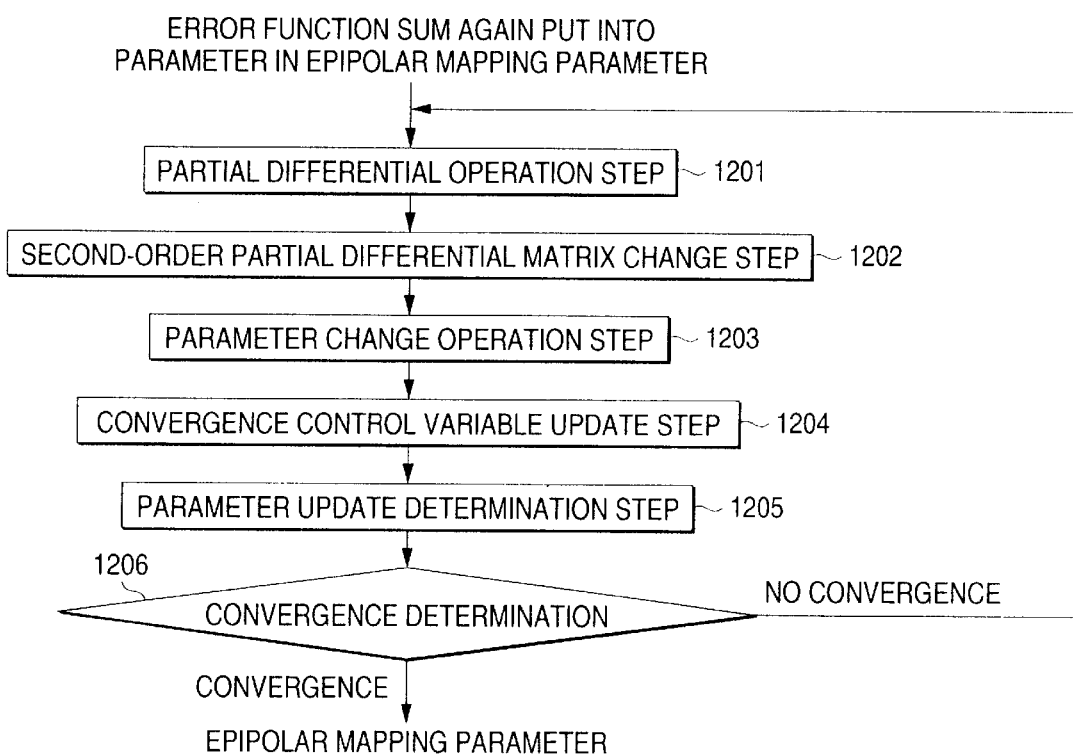
FIG. 12 is a step block diagram of a nonlinear iteractive minimization step with respect to epipolar mapping parameter in the seventh embodiment of the invention.

The step flow for executing the above-described sequence is shown in FIG. 12 and will be discussed. FIG. 12 is a step block diagram of the nonlinear iteractive minimization step with respect to epipolar mapping parameter (804).

In FIG. 12, numeral 1201 denotes a partial differential operation step, numeral 1202 denotes a second-order partial differential matrix change step, numeral 1203 denotes a parameter change operation step, numeral 1204 denotes a convergence control variable update step, numeral 1205 denotes a parameter update determination step, and numeral 1206 denotes a convergence determination step.

The steps 1201 to 1206 in the seventh embodiment differ from the steps 401 to 406 in the first embodiment only in that the number of parameters to be estimated is changed from eight to seven; they do not substantially differ. Thus, the used variable names (first-order partial differential vector g, second-order partial differential matrix H, etc.,) are duplicate for giving a description.

Partial differential operation step (1201) As shown in expressions 84 and 85, a first-order partial differential vector g and a second-order partial differential matrix H are calculated for expression 82.

$$g = \left( \frac{\partial E^{epi}}{\partial x_{e1}} \ \frac{\partial E^{epi}}{\partial y_{e2}} \ \frac{\partial E^{epi}}{\partial x_{e2}} \ \frac{\partial E^{epu}}{\partial y_{e2}} \ \frac{\partial E^{epi}}{\partial k_2} \ \frac{\partial E^{epi}}{\partial k_2} \ \frac{\partial E^{epi}}{\partial k_3} \right)^t \tag{84}$$

$$H = \begin{pmatrix} \frac{\partial^2 E^{epi}}{\partial x_{e1}^2} & \frac{\partial^2 E^{epi}}{\partial x_{e1} \partial y_{e1}} & \cdots & \frac{\partial^2 E^{epi}}{\partial x_{e1} \partial k_3} \\ \frac{\partial^2 E^{epi}}{\partial y_{e1} \partial x_{e1}} & \frac{\partial^2 E^{epi}}{\partial y_{e1}^2} & \cdots & \frac{\partial^2 E^{epi}}{\partial y_{e1} \partial k_3} \\ \vdots & \vdots & \ddots & \vdots \\ \frac{\partial^2 E^{epi}}{\partial k_3 \partial x_{e1}} & \frac{\partial^2 E^{epi}}{\partial k_3 \partial y_{e1}} & \cdots & \frac{\partial^2 E^{epi}}{\partial k_3^2} \end{pmatrix} \tag{85}$$

Second-order partial differential matrix change step (1202): As shown in expression 86, diagonal matrix AbsoluteDiag (H) provided by converting the diagonal elements of the second-order partial differential matrix H into absolute values and multiplying by λ is added to the second-order partial differential matrix H to produce Hd. Element dij of the diagonal matrix AbsoluteDiag (H) is given in expression 87. The initial value of λ is 1.0.

$$H_d = H + \lambda \text{AbsoluteDiag}(H), \tag{86}$$

$$d_{ij} = \begin{cases} |h_{ij}| & i = j \text{ or} \\ 0 \end{cases} \tag{87}$$

Parameter change operation step (1203): Mapping parameter change δq and a new candidate q' are calculated according to expression 87.

$$\delta q = H_d^{-1} g \tag{88}$$

$$q' = q - \delta q \tag{89}$$

Convergence control variable update step (1204): The minimization component provided by setting the mapping parameter to q' is calculated according to expression 90. On the other hand, an ideal minimization component provided if expression 82 is assumed to be a quadratic function of the mapping parameter q is calculated according to expression 91.

If the ratio of expression 90 to expression 91 exceeds 0.7, λ is halved. In contrast, if the ratio of expression 90 to expression 91 falls below 0.3, λ is doubled.

$$e_{real} = E(q) - E(q') \tag{90}$$

$$e_{ideal} = g'\delta q + \frac{1}{2}\delta q' H \delta q \tag{91}$$

Parameter update determination step (1205): If expression 90 is positive, q' is updated as q.

Convergence determination step (1206): If the conditional expression of expression 92 is satisfied or the number of repetitions exceeds 100, q is output as the result; otherwise, the current λ and q are held and the steps are again repeated starting at the partial differential operation step (1201).

$$|q'-q| > 0.0001 \tag{92}$$

Last, the correspondence-between-images detection method shown in the seventh embodiment can be installed as a correspondence-between-images detection system as in the first embodiment. To do this, the program executed in the arithmetic processing unit (505) in the second embodiment may be replaced with the epipolar mapping parameter representation step of quadratic error function sum (803) and the nonlinear iterative minimization step with respect to eipolar mapping parameter (804) in FIG. 8 as an eighth embodiment of the invention.

From the eight embodiments shown so far, the features of the invention can be summarized as follows:

1. If a move between different projection images is large, stable parameter estimation cannot be executed in the intensity error minimization technique shown in the related art example. The method based on the feature point correspondence is robust with respect this point.

On the other hand, in application to an image coder-decoder for transmitting and storing an image in a small coding amount or the like, it is important to execute predicting coding (differential coding) by estimating the mapping parameter for minimizing an intensity error from different images; the intensity error minimization technique is fitter in this point.

The invention integrates the advantages of the two techniques in the related arts; the block matching result is represented as an intensity error function, whereby it is made possible to execute robust parameter estimation for minimizing the intensity error.

2. The current moving image coder based on predicting coding (differential coding) uses block matching of 16×16 pixels; it is already verified to easily put into hardware. On the other hand, the parameter estimation step following the block matching needs only to perform operations on 330 block positions, and can be realized by an arithmetic processing unit and software.

3. Block matching is executed only once and it is not necessary to again execute block matching concerning parameter estimation. Using the output result of an image coder-decoder, parameter estimation can be executed separately.

As described above, in the invention, even if a large move distance exists between the corresponding positions of different projection images, mapping parameter estimation can be executed for intensity error minimization. That is, the invention has the merits of both the intensity error minimization and the estimation method based on the feature point correspondence in the related arts. The advantages of the invention are as follows:

In the first aspect of the invention, using the result of the correspondence between local areas (block matching), an intensity error is represented in a mapping parameter and nonlinear iterative minimization using a second-order partial differential matrix is performed for executing parameter estimation. Thus, if a continuous function with respect to partial differential is applied, any desired mapping parameter can be estimated.

In the second aspect of the invention, a mapping parameter not requiring an initial value, namely, not requiring recursive operations is found in the process of processing the result of the correspondence between local areas, and is adopted as the parameter initial value of nonlinear iterative minimization. Thus, stable nonlinear mapping parameter estimation can be executed.

In the third aspect of the invention, weighting minimization of [0, 1] is realized using the fact that a quadratic error function is designed so as to set the minimum value to zero.

Thus, the weight of the correspondence between local areas with a large error can be lessened continuously and it is made possible to exclude the effects of erroneous correspondence between local areas and correspondence between local areas belonging to different mapping parameters.

According to the fourth aspect of the invention, the sum total or partial sum of the quadratic error functions to be minimized is again represented in a parameter for defining a function from the relationship between a line mapped and a displacement for determining the value of the quadratic error function, whereby a mapping parameter between partial sets of pixels such as not only mapping from a point to a point, but also mapping from a point to a line and from a line to a line can be estimated.

According to the advantages, the invention can be applied to an image coder-decoder based on predicting coding (differential coding), a stereoscopic image measuring device, and a wide field image generator, and is high in industrial applicability.

What is claimed is:

1. A method of representing correspondence between two images as a function of mapping a position set on one image to a position set to the other and finding a mapping parameter for defining the function, thereby obtaining motion between the images, said method comprising:

(1a) error operation step of, for a plurality of local areas into which an image is divided, calculating the local area correspondence between two different images as an error and finding a displacement between the local areas reaching the minimum error and an error value in the proximity of the displacement;

(1b) error function operation step of finding for each local area a quadratic error function with displacement as a variable from the displacement reaching the minimum error and the error value in the proximity of the displacement; and (1c) nonlinear iterative minimization step of again representing the sum total or partial sum of the quadratic error functions in a parameter representing a function and executing nonlinear iterative minimization for the parameter for finding a parameter, said nonlinear iterative minimization step comprising:

(1c-1) partial differential operation step of finding a first-order partial differential vector and a second-order partial differential matrix concerning the parameter of the sum total or partial sum of the quadratic error functions;

(1c-2) second-order partial differential matrix change step of increasing diagonal elements of the second-order partial differential matrix in response to the degree to which the minimization in each repetition falls below a predetermined expected value; and (1c-3) parameter change step of multiplying the first-order partial differential vector by an inverse matrix of the modified second-order partial differential matrix for providing a parameter increment or decrement, wherein each parameter increment or decrement provided by iterating said partial differential operation step, said second-order partial differential matrix change step, and said parameter change step is added sequentially for changing the parameter for executing the minimization.

2. A system of representing correspondence between two images as a function of mapping a position set on one image to a position set to the other and finding a mapping parameter for defining the function, thereby obtaining motion between the images, said system comprising:

(2a) error operation means for, for a plurality of local areas into which an image is divided, calculating the local area correspondence between two different images as an error and finding a displacement between the local areas reaching the minimum error and an error value in the proximity of the displacement;

(2b) error function operation means for finding for each local area a quadratic error function with displacement as a variable from the displacement reaching the minimum error and the error value in the proximity of the displacement; and (2c) nonlinear iteractive minimization means for again representing the sum total or partial sum of the quadratic error functions in a parameter representing a function and executing nonlinear iteractive minimization for the parameter for finding a parameter, said nonlinear iteractive minimization means comprising:

(2c-1) partial differential operation means for finding a first-order partial differential vector and a second-order partial differential matrix concerning the parameter of the sum total or partial sum of the quadratic error functions;

(2c-2) second-order partial differential matrix change means for increasing diagonal elements of the second-order partial differential matrix in response to the degree to which the minimization in each repetition falls below a predetermined expected value; and (2c-3) parameter change means for multiplying the first-order partial differential vector by an inverse matrix of the modified second-order partial differential matrix for providing a parameter increment or decrement, wherein each parameter increment or decrement provided by iterating said partial differential operation means, said second-order partial differential matrix change means, and said parameter change means is added sequentially for changing the parameter for executing the minimization.

3. A method of representing correspondence between two images as a function of mapping a position set on one image to a position set to the other and finding a mapping parameter for defining the function, thereby obtaining motion between the images, said method comprising:

(3a) error operation step of, for a plurality of local areas into which an image is divided, calculating the local area correspondence between two different images as an error and finding a displacement between the local areas reaching the minimum error and an error value in the proximity of the displacement;

(3b) error function operation step of finding for each local area a quadratic error function with displacement as a variable from the displacement reaching the minimum error and the error value in the proximity of the displacement;

(3c) linear parameter operation step of again representing the sum total or partial sum of the quadratic error functions in a parameter representing a function, classifying into a linear-minimization-possible parameter with a partial derivative for parameter becoming a linear function and a nonlinear minimization parameter with a partial derivative for parameter not becoming a linear function, and finding only the former by executing linear minimization; and (3d) all parameter operation step of finding all parameters by executing nonlinear iteractive minimization of the sum total or partial sum of the quadratic error functions with the parameter found by executing said linear parameter operation step as an initial value for the linear-minimization-possible parameter.

4. A system of representing correspondence between two images as a function of mapping a position set on one image to a position set to the other and finding a mapping parameter for defining the function, thereby obtaining motion between the images, said system comprising:

(4a) error operation means for, for a plurality of local areas into which an image is divided, calculating the local area correspondence between two different images as an error and finding a displacement between the local areas reaching the minimum error and an error value in the proximity of the displacement;

(4b) error function operation means for finding for each local area a quadratic error function with displacement as a variable from the displacement reaching the minimum error and the error value in the proximity of the displacement;

(4c) linear parameter operation means for again representing the sum total or partial sum of the quadratic error functions in a parameter representing a function, classifying into a linear-minimization-possible parameter with a partial derivative for parameter becoming a linear function and a nonlinear minimization parameter with a partial derivative for parameter not becoming a linear function, and finding only the former by executing linear minimization; and (4d) all parameter operation means for finding all parameters by executing nonlinear iteractive minimization of the sum total or partial sum of the quadratic error functions with the parameter found by said linear parameter operation means as an initial value for the linear-minimization-possible parameter.

5. method of representing correspondence between two images as a function of mapping a position set on one image to a position set to the other and finding a mapping parameter for defining the function, thereby obtaining motion between the images, said method comprising:

(5a) error operation step of, for a plurality of local areas into which an image is divided, calculating the local area correspondence between two different images as an error and finding a displacement between the local areas reaching the minimum error and an error value in the proximity of the displacement;

(5b) error function operation step of finding for each local area a quadratic error function having a minimum value of zero with displacement as a variable from the displacement reaching the minimum error and the error value in the proximity of the displacement;

(5c) recursive minimization step of again representing the weighted sum total of the quadratic error functions in a parameter representing a function and executing recursive minimization for the parameter for finding a parameter; and (5d) weighting resetting step of setting a weight inversely proportional to the value of the quadratic error function in the iteration process of the recursive minimization.

6. A system of representing correspondence between two images as a function of mapping a position set on one image to a position set to the other and finding a mapping parameter for defining the function, thereby obtaining motion between the images, said system comprising:

(6a) error operation means for, for a plurality of local areas into which an image is divided, calculating the local area correspondence between two different images as an error and finding a displacement between the local areas reaching the minimum error and an error value in the proximity of the displacement;

(6b) error function operation means for finding for each local area a quadratic error function having a minimum value of zero with displacement as a variable from the displacement reaching the minimum error and the error value in the proximity of the displacement;

(6c) recursive minimization means for again representing the weighted sum total of the quadratic error functions in a parameter representing a function and executing recursive minimization for the parameter for finding a parameter; and (6d) weighting resetting means for setting a weight indirectly proportional to the value of the quadratic error function in the iteration process of the recursive minimization.

7. A method of representing correspondence between two images as a function of mapping a position set on one image to a position set to the other and finding a mapping parameter for defining the function, thereby obtaining motion between the images, said method comprising:

(7a) error operation step of, for a plurality of local areas into which an image is divided, calculating the local area correspondence between two different images as an error and finding a displacement between the local areas reaching the minimum error and an error value in the proximity of the displacement;

(7b) error function operation step of finding for each local area a quadratic error function with displacement as a variable from the displacement reaching the minimum error and the error value in the proximity of the displacement;

(7c) error parameter conversion step of again defining the sum total or partial sum of the quadratic error functions in a parameter for defining a function from the relationship between a line mapped and a displacement for determining the value of the quadratic error function; and (7d) minimization step of minimizing the sum total or partial sum of the quadratic error functions again converted into the parameter for parameter and outputting the minimization parameter as motion between the images.

8. A system of representing correspondence between two images as a function of mapping a position set on one image to a position set to the other and finding a mapping parameter for defining the function, thereby obtaining motion between the images, said system comprising:

(8a) error operation means for, for a plurality of local areas into which an image is divided, calculating the local area correspondence between two different images as an error and finding a displacement between the local areas reaching the minimum error and an error value in the proximity of the displacement;

(8b) error function operation means for finding for each local area a quadratic error function with displacement as a variable from the displacement reaching the minimum error and the error value in the proximity of the displacement;

(8c) error parameter conversion means for again defining the sum total or partial sum of the quadratic error functions in a parameter for defining a function from the relationship between a line mapped and a displacement for determining the value of the quadratic error function; and (8d) minimization means for minimizing the sum total or partial sum of the quadratic error functions again converted into the parameter for parameter and outputting the minimization parameter as motion between the images.

* * * * *